United States Patent [19]
Kamitani et al.

[11] Patent Number: 5,796,201
[45] Date of Patent: Aug. 18, 1998

[54] ROTOR OF AN AC GENERATOR FOR A VEHICLE

[75] Inventors: Kiyoaki Kamitani, Kasugai; Akiya Shichijyo, Ama-gun; Shin Kusase; Kenzo Mitani, both of Obu; Hiroaki Ishikawa, Nagoya, all of Japan

[73] Assignees: Tokai Rubber Industries, Ltd., Komaki; Nippondenso Co., Ltd., Kariya, both of Japan

[21] Appl. No.: 687,194

[22] Filed: Jul. 25, 1996

[30] Foreign Application Priority Data

Jul. 28, 1995 [JP] Japan ................. 7-193657

[51] Int. Cl.$^6$ .......................... H02K 3/30; H02K 19/22
[52] U.S. Cl. ........................... 310/194; 310/263; 310/45
[58] Field of Search ........................... 310/194, 263, 310/45, 208, 261, 164, 179, 180, 195, 49 R, 49 A

[56] References Cited

U.S. PATENT DOCUMENTS

| | | | |
|---|---|---|---|
| 3,129,348 | 4/1964 | Simmons | 310/263 |
| 3,671,906 | 6/1972 | Hodges et al. | 310/263 |
| 4,988,055 | 1/1991 | Sakai et al. | 242/159 |
| 5,081,383 | 1/1992 | Kusumoto et al. | 310/59 |
| 5,306,977 | 4/1994 | Hayashi | 310/263 |
| 5,344,635 | 9/1994 | Bujard et al. | 423/412 |
| 5,361,242 | 11/1994 | Chaya et al. | 369/13 |
| 5,659,217 | 8/1997 | Petersen | 310/156 |

FOREIGN PATENT DOCUMENTS 02277439A  11/1990  Japan.

*Primary Examiner*—Thomas M. Dougherty
*Assistant Examiner*—Judson H. Jones
*Attorney, Agent, or Firm*—Jacobson, Price, Holman & Stern, PLLC

[57] ABSTRACT

In a rotor of an AC generator for a vehicle, a coil bobbin, around which rotor coil is wound, includes a bobbin body having a first through hole at a winding drum portion and is made of hard resin. A first hole member is kept at the first through hole and is made of good thermal conductivity rubber. An outer peripheral layer is formed integrally with the first hole member and is made of good thermal conductivity rubber covering the outer peripheral surface of the winding drum portion. An improved rotor of an AC generator for a vehicle is provided, in which a regular winding property of the rotor coil is improved and at the same time, heat of the rotor coil can be more effectively radiated to the rotor core side so that generator output can be improved.

12 Claims, 5 Drawing Sheets

ROTOR OF AN AC GENERATOR FOR A VEHICLE

BACKGROUND OF THE INVENTION

1. Field of the Invention

The present invention relates to a rotor, which is mounted on a vehicle, of an AC generator for a vehicle

2. Description of the Related Art

As a conventional AC generator, the following has been generally known. An AC generator which is mounted on a vehicle comprises: a rotor core which is shaped in a claw-pole and having a boss portion which is forced to be fixed into a rotor axis and having a disk portion whose pole claws are formed at a tip portion arising in an outside diameter direction from both sides of said boss portion; a coil bobbin having a winding drum portion around which a rotor coil is wound and having flange portions formed at both sides of said winding drum portion; and a rotor coil; said winding drum portion being inserted to said boss portion of said rotor core; and said flange portions being inserted so as to face and connect an inner peripheral surface of said disc portion of said rotor core.

In this kind of AC generator, a coil bobbin around which a rotor coil is wound is built in the rotor core which is forced to be fit into the rotor axis so that the structure thereof prevents heat from radiating to the outside when electric current runs to the rotor coil and generation of heat is occurred. Accordingly, the rising of the temperature at the rotor coil increases value of resistance, and as a result, there arises a disadvantage that it reduces output current at the generator.

Therefore, as disclosed in Japanese Unexamined Patent Publication (KOKAI) No. 123459/1989, it has been known that a clearance gap between rotor coils each other and a clearance gap between the coil bobbin and the rotor core is filled by good thermal conductivity resins by using a vacuum impregnating method.

Also, as disclosed in Japanese Unexamined Patent Publication (KOKAI) No. 17672/1992, it has been known that good thermal conductivity resin having insulating property are filled in a plurality of openings which are provided at the winding drum portion and the flange portion of the coil bobbin respectively so as to radiate heat of the rotor coil to the rotor core side.

However, the prior art disclosed in Japanese Unexamined Patent Publication (KOKAI) No. 123459/1989 has the following disadvantages. The clearance gaps between the rotor coils each other are extremely small, therefore, fluidized resistance of good thermal conductivity resins is increased so that it is difficult to fill good thermal conductivity resins not only between rotor coils each other but also between the rotor coil and the coil bobbin and sufficient radiating property cannot be obtained. Moreover, the use of the vacuum impregnating method needs large scale of equipment.

On the other hand, the prior art disclosed in Japanese Unexamined Patent Publication (KOKAI) No. 17672/1992 has the following disadvantages. It needs troublesome work in which good thermal conductivity resin having agglutinating property is filled only in the opening of the coil bobbin. This prior art also needs thermal hardening process after filling good thermal conductivity resins. Therefore, in the case of the rotor having large amount of heat capacity, it needs a long time to heat and cool.

Furthermore, the above-mentioned prior art discloses that the rotor coil is wound around the coil bobbin before filling good thermal conductivity resins. Therefore it has the following disadvantages: the rotor coil which is wound around the coil bobbin tends to generate irregular winding by falling in the opening provided at the coil bobbin; and it is easy to cause the reduction in space factor of the rotor coil and the reduction in rotational movement resistance property (fixing force) of the rotor coil. Based on these reasons, there is a limit to provide the opening formed at the coil bobbin at large area so that there is also a limit in the heat transfer amount of resin materials and sufficient radiation of heat to the rotor core side cannot be obtained.

SUMMARY OF THE INVENTION

The present invention has been developed in view of the above-mentioned problems. It is an object of the present invention to provide a rotor of AC generator for a vehicle, in which normal winding of the rotor coil is improved and at the same time; in which heat of the rotor coil is more effectively radiated to the rotor core side; and in which generator output is improved.

An AC generator for a vehicle which solves the above-mentioned problems comprises: a rotor core which is shaped in a claw-pole and having a boss portion which is forced to be fixed into a rotor axis and having a disk portion whose pole claws are formed at a tip portion arising in an outside diameter direction from both sides of said boss portion; a coil bobbin having a winding drum portion around which a rotor coil is wound and having flange portions formed at both sides of said winding drum portion; and a rotor coil; said winding drum portion being inserted to said boss portion of said rotor core; and said flange portions being inserted so as to face and connect an inner peripheral surface of said disc portion of said rotor core;

wherein said coil bobbin comprises: a bobbin body having a through hole at said winding drum portion and being made of hard resin; a hole member which is kept at said through hole and which is made of good thermal conductivity rubber; and an outer peripheral layer which is formed with said hole member integrally and which is made of good thermal conductivity rubber covering the outer peripheral surface of said winding drum portion.

Also, in a second aspect, the AC generator for a vehicle of the present invention comprises: a rotor core which is shaped in a claw-pole and having a boss portion which is forced to be fixed into a rotor axis and having a disk portion whose pole claws are formed at a tip portion arising in an outside diameter direction from both sides of said boss portion; a coil bobbin having a winding drum portion around which a rotor coil is wound and having flange portions formed at both sides of said winding drum portion; and a rotor coil; said winding drum portion being inserted to said boss portion of said rotor core; and said flange portions being inserted so as to face and connect an inner peripheral surface of said disc portion of said rotor core;

wherein said coil bobbin comprises: a bobbin body having a through hole at said winding drum portion and being made of hard resin; a hole member which is kept at said through hole and which is made of good thermal conductivity rubber; and a covering layer which is formed with said hole member integrally and which is made of good thermal conductivity rubber covering at least one of the inner surface and the outer surface of said flange portion.

Furthermore, in a third aspect, the AC generator for a vehicle of the present invention comprises: a rotor core which is shaped in a claw-pole and having a boss portion which is forced to be fixed into a rotor axis and having a disk portion whose pole claws are formed at a tip portion arising in an outside diameter direction from both sides of said boss portion; a coil bobbin having a winding drum portion around which a rotor coil is wound and having flange portions formed at both sides of said winding drum portion; and a rotor coil; said winding drum portion being inserted to said boss portion of said rotor core; and said flange portions being inserted so as to face and connect an inner peripheral surface of said disc portion of said rotor core;

wherein said coil bobbin comprises: a bobbin body having a through hole at said winding drum portion and said winding drum portion which being made of hard resin; a hole member which is kept at said through hole and which is made of good thermal conductivity rubber; an outer peripheral layer which is formed with said hole member integrally and which is made of good thermal conductivity rubber covering the outer peripheral surface of said winding drum portion; and a covering layer which is formed with said hole member integrally and which is made of good thermal conductivity rubber covering at least one of the inner surface and the outer surface of said flange portion.

In the present invention, good thermal conductivity rubber composing of the hole member, the outer peripheral layer and the covering layer can be obtained by blending a matrix resin and a thermal conductivity filler.

The above-mentioned matrix resin can be selected from the group consisting of: natural rubber; synthetic rubber such as styrene-butadiene rubber, butadiene rubber, chloroprene rubber, nitrile rubber, butyl rubber, ethylene propylene rubber, silicone rubber, fluoro rubber, acrylic rubber, epichlorohydrin rubber; and thermoplastic elastomer such as polyolefin. Among them, it is preferable to use silicon rubber which has improved heat-resisting property even at a high temperature when the rotor coil generates heat, which does not generate poisonous gas for it does not include halogen and so on, and which has improved working performance at roll and kneader.

The above-mentioned thermal conductivity filler may be selected from the group consisting of boron nitride, aluminum nitride, alumina, silicon nitride and magnesium oxide. Among these, it is preferable to use alumina which can be filled in a large amount to the matrix resin and which is in sphere shape.

The rubber hardness Hs (JIS A) of the above-mentioned good thermal conductivity rubber preferably falls in the range of from 55 to 85. If the rubber hardness Hs is less than 55, the sufficient strength can not be secured. And if the rubber hardness exceeds 85, there arises a shortage of rubber elasticity so that the rotor coil has a shortage of thrust and sufficient large tough area of the rotor coil is hard to be secured.

As a preferable mode of the present invention, a plurality of grooves which extend in a circumferential direction and toward the outer peripheral surface of the winding drum portion of the coil bobbin is formed.

As another preferable mode of the present invention, a fan is provided at at least one end face of an axial direction of the rotor core.

In the rotor of an AC generator for a vehicle of the present invention, in the case when a hole member which is kept at the through hole and which is made of good thermal conductivity rubber; and a peripheral layer which is forced with the hole member integrally and which is made of good thermal conductivity rubber covering the outer peripheral surface of the winding drum portion are provided, rotor coil is wound in the state in which the rotor coil is pressed and connected to the outer peripheral surface thereof.

Accordingly, the outer peripheral surface thereof becomes a depressed state because of elastic deformation caused by crimping force of the rotor coil. Therefore, a coefficient of friction between the outer peripheral surface made of a rubber member and the rotor coil is higher than that between the conventional synthetic resin and the rotor coil so that force of constraint caused by the coil bobbin of the rotor coil is increased. Also, the whole of the winding surface around which the rotor coil is wound is covered by the outer peripheral layer made of rubber so that rotor coil does not fall in the opening formed at the coil bobbin as the conventional rotor coil does. Owing to these two functions, the winding property is improved. Furthermore, a large amount of tough area in which rotor coil gets in contact with the outer peripheral layer is secured. Accordingly, the whole of the inner peripheral side in which the rotor coil is wound around the winding drum portion becomes the state in which it adheres to the outer peripheral layer. Therefore, heat generated at the rotor coil is extremely efficiently radiated from the outer peripheral layer to the rotor core side through the hole member and at the same time, rotational movement resistance property of the rotor coil against the coil bobbin is improved.

Also, in the case when the through hole is provided at the flange portion of the bobbin body; a hole member which is kept at said through hole and which is made of good thermal conductivity rubber is provided; and a covering layer which is formed with said hole member integrally and which is made of good thermal conductivity rubber covering at least one of the inner surface and the outer surface of said flange portion is provided, both side portions of the rotor coil get in contact with the covering layer or the hole member and at the same time, the rotor core becomes the state in which it gets in contact with the covering layer or the hole member. Accordingly, furthermore, the touch area of the rotor coil and the coil bobbin is increased so that the radiation property thereof is improved.

Furthermore, a plurality of grooves which extend in the radial direction toward the outer peripheral surface of the winding drum portion of the coil bobbin are formed so that when the rotor coil is wound along the grooves, the outer peripheral layer becomes the state in which it is deformed elastically along the grooves and the touch area of the rotor coil is increased more.

Moreover, if the fan is provided at the end surface in the axial direction of the rotor core, heat which is of the rotor coil and which is transmitted to the rotor core is transmitted to the fan so that the radiating property is improved more.

In the present invention, the outer peripheral layer and the covering layer can be assembled not passing trough impregnation treatment but by molding rubber member integrally to the bobbin body. Accordingly, the present invention does not cause the problem of the production in which there arises insufficient filling generated at the time of filling resin as the conventional device causes.

Based on the present invention, the coil bobbin comprises: a bobbin body having a through hole at said winding drum portion and being made of hard resin; a hole member which is kept at said through hole and which is made of good thermal conductivity rubber; and a peripheral layer which is formed with said hole member integrally and which is made of good thermal conductivity rubber covering the outer peripheral surface of said winding drum portion. Therefore, regular winding property of the rotor coil is improved and at the same time, heat of the rotor coil can be more effectively radiated to the rotor core side so that generator output can be improved.

Furthermore, the through hole is provided at the flange portion of the bobbin body; a hole member which is kept at said through hole and which is made of good thermal conductivity rubber is provided; and a covering layer which is formed with said hole member integrally and which is made of good thermal conductivity rubber covering at least one of the inner surface and the outer surface of said flange portion is provided. Therefore, frictional force between the rotor coil and the flange portion and frictional force between the flange portion and the disc portion are increased so that not only fixing force of the rotor coil against the bobbin body and the rotor core is strengthened but also heat generated at the rotor coil can be radiated extremely efficiently to the rotor core side also from the flange side through the hole member and the covering layer. Furthermore, radiating effect is improved more so that generator output can be improved.

Moreover, a plurality of grooves which extend in the radial direction toward the outer peripheral surface of the winding drum portion of the coil bobbin are formed. Accordingly, by winding the rotor coil along the grooves, touch area of the rotor coil is enlarged more so that regular winding property of the rotor coil is improved more and at the same time, radiation of the rotor coil can be conducted more efficiently.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENT

Having generally described the present invention, a further understanding can be obtained by reference to the specific preferred embodiments which are provided herein for purposes of illustration only and are not intended to limit the scope of the appended claims.

Hereinafter, a Preferred Embodiment will be concretely described by way of Figures.

Figure 1:
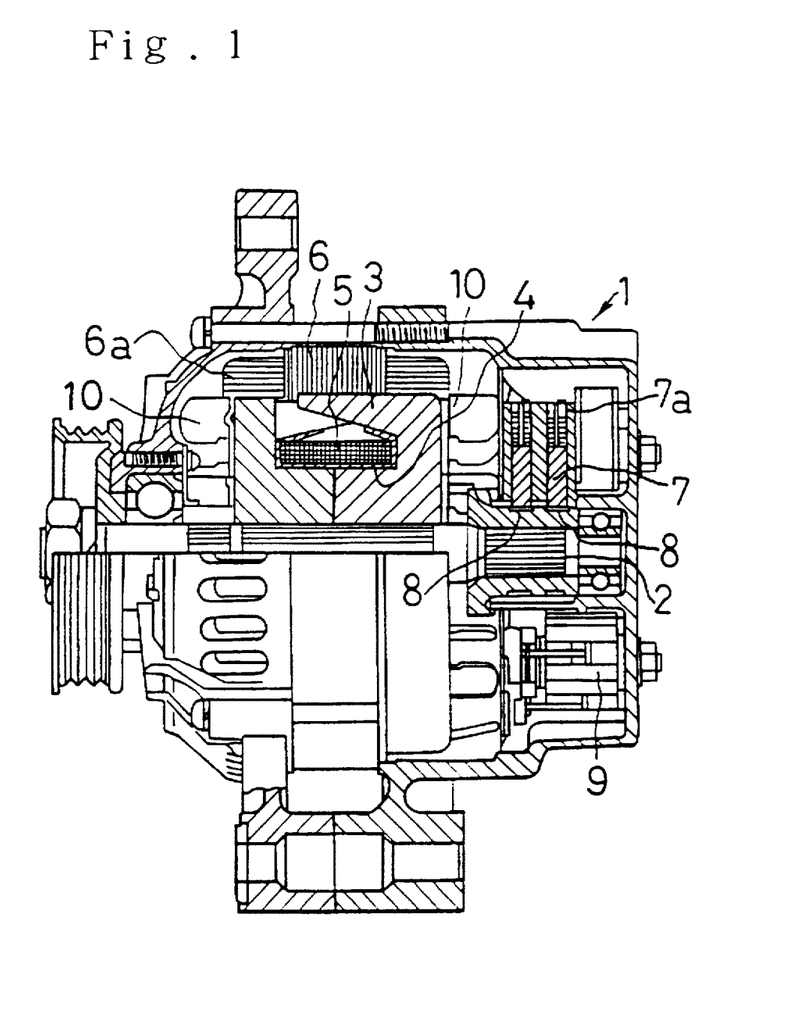
FIG. 1 is a partly cutaway sectional side view of a rotor of an AC generator for a vehicle of a Preferred Embodiment of the present invention.
Figure 2:
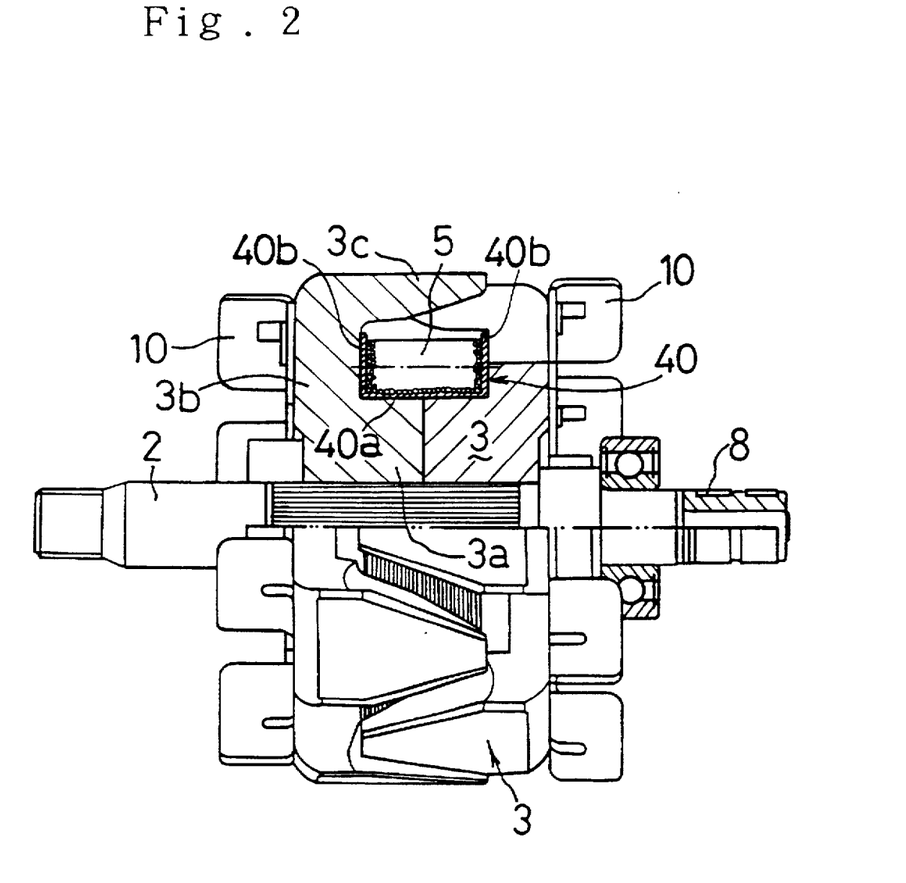
FIG. 2 is a partly cutaway sectional side view of a rotor core portion of the Preferred Embodiment of the present invention.

FIG. 1 is a partly cutaway sectional side view of a rotor of an AC generator for a vehicle of a Preferred Embodiment of the present invention; and FIG. 2 is a partly cutaway sectional side view of a rotor core portion thereof.

The AC generator for a vehicle 1, as shown in FIG. 1, comprises a rotor core 3 which is forced to be fixed into a rotor axis 2 and which is the so-called claw-pole type; a coil bobbin 4 which is provided in the rotor core 3 and which will be mentioned later; a rotor coil 5 which is wound around the coil bobbin; a stator 6 around which a stator coil 6a is wound; a brush 7 which is contained suppresively in a brush holder 7a; a slip ring 8 to which the brush 7 is connected slidably; and a rectifier portion 9 which rectifies generated alternating current. The AC generator for a vehicle comprises the above-mentioned various members in the same way as the conventional AC generator does.

The rotor core 3 comprises: a boss portion 3a which is forced to be fixed to the rotor axis 2; a disc portion 3b which arises in the outside diameter direction from both sides of the boss portion 3a; and a plurality of pole claws 3c which project in the state in which they engage one another having the predetermined distance from the tip of each disc portion 3b toward the axial direction.

The coil bobbin 4 is mainly composed of a bobbin body 40 which is made of hard resin and which comprise: a winding drum portion 40a around which the rotor coil 5 is wound and which is in a cylindrical shape; and flange portions 40b and 40b which are formed at both ends of the winding drum portion 40a. To the winding drum portion 40a, the boss portion 3a of the rotor core 3 is inserted so as to match from both sides. And also to the flange portion 40b, the inner peripheral surface of the disc portion 3b of the rotor core 3 is inserted into the rotor core 3 so as to face to touch each other.

At both outside surfaces of the rotor core 3, a cooling fan 10 is fixed.

Figure 3:
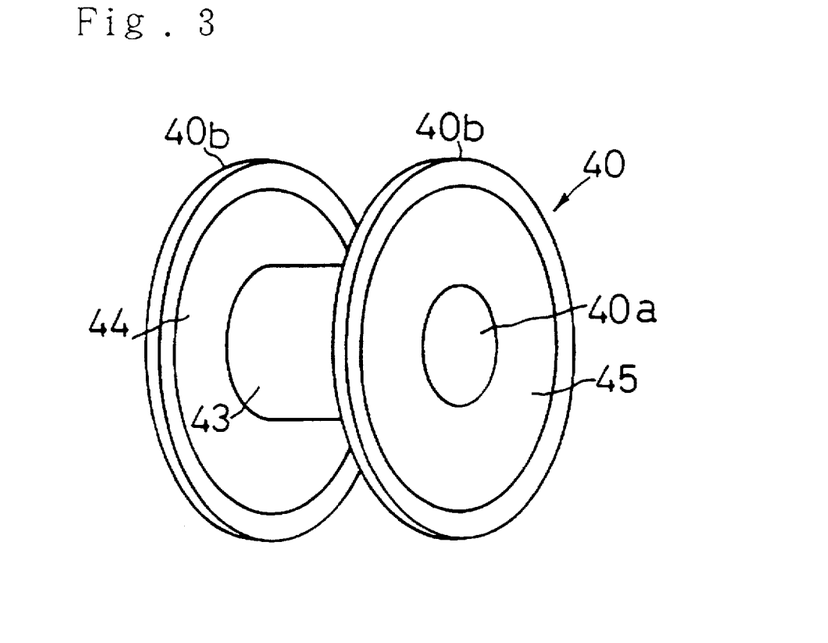
FIG. 3 is a perspective view of a coil bobbin of the Preferred Embodiment of the present invention.
Figure 4:
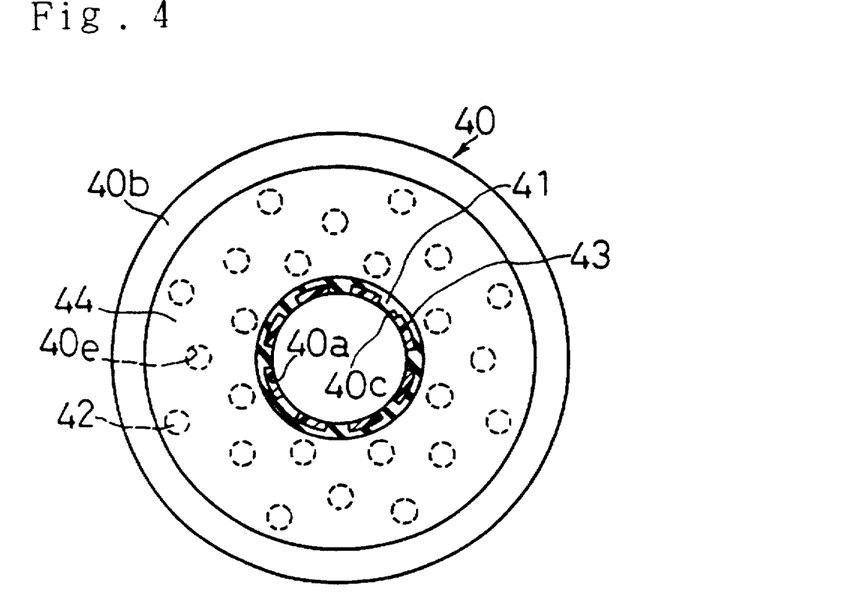
FIG. 4 is a sectional view in the direction which is perpendicular to an axis of the coil bobbin concerning the Preferred Embodiment of the present invention.
Figure 5:
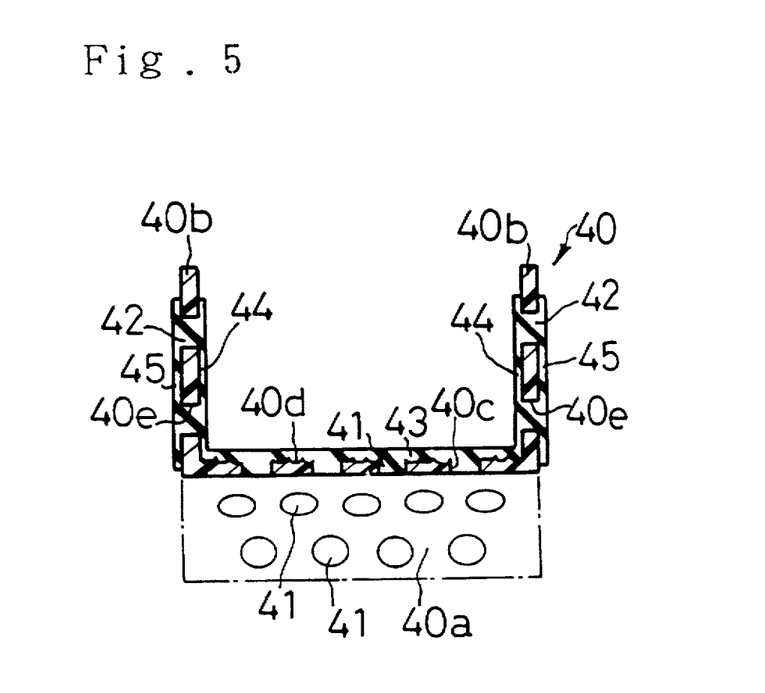
FIG. 5 is a partly cutaway sectional view in the axial direction of the coil bobbin concerning the Preferred Embodiment of the present invention.

FIG. 3 is a perspective view of a coil bobbin of the present Preferred Embodiment; FIG. 4 is a sectional view in the direction which is perpendicular to an axis of the coil bobbin thereof; and FIG. 5 is a partly cutaway sectional view in the axial direction of the coil bobbin thereof.

At the winding drum portion 40a of the coil bobbin 4, a plurality of first through holes 40c are formed having appropriate spaces; and at the same time, at the outer peripheral surface of the winding drum portion 40a, there are provided a plurality of grooves 40d which extend in the radial direction having almost the same width as the thickness of the rotor coil 5. At the flange portion 40b, there are provided a plurality of second through holes 40e which penetrate in the axial direction having the appropriate spaces. At the first through holes 40c and the second though holes 40e, a first hole member 41 and a second hole member 42 which are made of good thermal conductivity rubber are kept in the state in which they are buried.

At the outer peripheral surface of the winding drum portion 40a, there is provided an outer peripheral layer 43 which are formed integrally of the same good thermal conductivity rubber as that of the first hole member 41 so as to cover the whole area of the outer peripheral surface; and at the same time, at the inner surface of the outer surface of each of flange portions 40b and 40b, there are provided an inner covering layer 44 and an outer covering layer 45 which are formed integrally of the same good thermal conductivity rubber as that of the second hole member 42 so as to cover these surfaces. Good thermal conductivity rubber used here is composed by mixing silicon rubber 100 weight portion as a matrix resin, spherical alumina 300 weight portion as a thermal conductivity filler and peroxide 1 weight portion as a hardening agent. The hardness Hs (JIS A) of rubber thereof is 72.

The coil bobbin 4 of the present Preferred Embodiment is constructed as the above-mentioned way. Therefore, the rotor coil 5 which is wound around the coil bobbin 4 is wound in the state in which it gets in contact with the outer peripheral layer 43 made of good thermal conductivity rubber; so the inner peripheral side of the rotor coil 5 and the boss portion 3a of the rotor core 3 are securely connected each other through the outer peripheral layer 43 and the first hole member 41. Furthermore, the groove 40d is formed at the outer peripheral surface of the winding drum portion 40a. Therefore, the outer peripheral layer 43 is deformed elastically by crimping force of the rotor coil 5 so as to get in the state in which it is depressed along the groove 40d so that the touch area of the rotor coil 5 and the outer peripheral layer 43 is increased. Accordingly, the whole inner peripheral side of the rotor coil 5 which is wound around the winding drum portion 40a gets in the state in which it adheres to the outer peripheral layer 43. So, heat which is generated at the rotor coil 5 can be radiated from the outer peripheral layer 43 to the boss portion 3a side of the rotor coil 5 extremely efficiently through the first hole member 41.

Both side portions of the rotor coil 5 which are wound around the coil bobbin 4 get in the state in which they get in contact with the inner covering layer 44 made of good thermal conductivity rubber, so that the both side portions of the rotor coil 5 and a disc portion 3b of the rotor core 3 are securely connected through the inner covering layer 44, a second hole member 42 and an outer covering layer 45. Accordingly, heat generated at the rotor coil 5 can be radiated to the disc portion 3b side of the rotor core 3 extremely efficiently.

As mentioned above, according to the present Preferred Embodiment, the coil bobbin 4 includes: the first hole member 41 which is maintained in a first through hole 40c of the winding drum portion 40a of the bobbin body 40 and which is made of good thermal conductivity; and the outer peripheral layer 43 which is formed integrally to the first hole member 41 and which is made of good thermal conductivity rubber covering the outer peripheral surface of the winding drum portion 40a. Therefore, not only regular winding property of the rotor coil 5 and fixing force of the rotor coil 5 against the coil bobbin 4 and the rotor core 3 are improved but also it is possible to radiate heat generated at the rotor coil 5 to the rotor core 3 side more efficiently so that generator output can be improved.

At the outer peripheral surface of the winding drum portion 40a of the bobbin body 40, a plurality of grooves extending in the radial direction are formed. Accordingly, the touch area of the rotor coil 5 which is wound on the outer peripheral layer 43 can be enlarged and frictional force between the winding drum portion 40a and the rotor coil 5 is increased so that fixing force of the rotor coil 5 against the bobbin body 40 is improved more and at the same time, radiation of the rotor coil 5 can be conducted more efficiently.

In the case of the present Preferred Embodiment, it includes the second hole member 42 which is held in a second through hole 40e of the flange portion 40b of the bobbin body 40 and which is made of good thermal conductivity rubber; and the inner covering layer 44 and the outer covering layer 45 which are formed integrally to the second hole member 42 and which are made of good thermal conductivity rubber covering the inner surface and the outer surface of the flange portion 40b. Therefore, frictional force between the rotor coil 5 and the flange portion 40b and frictional force between the flange portion 40b and the disc portion 3b are improved so that not only fixing force of the rotor coil 5 against bobbin body 40 is more increased but also it is possible to radiate heat generated at the rotor coil 5 to the disc portion 3b of the rotor core 3 more efficiently. So, radiating function from the flange portion 40b is promoted so as to improve generator output more.

Moreover, cooling fans 10 and 10 are provided at both side surfaces of the rotor core 3 so that heat generated at the rotor coil 5 is transmitted to the cooling fans 10 and 10, so it is possible to improve generator output more.

Figure 6:
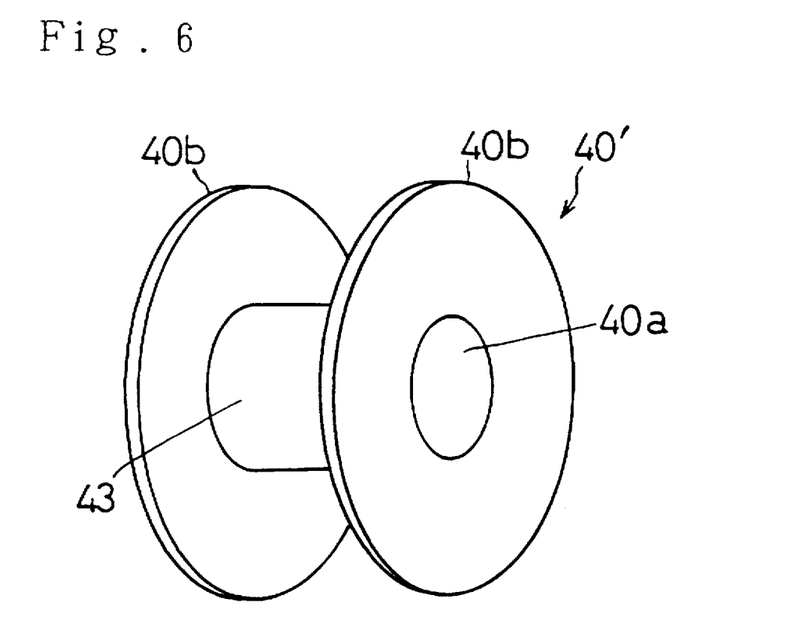
FIG. 6 is a perspective view of a coil bobbin concerning another preferred embodiment of the present invention.
Figure 7:
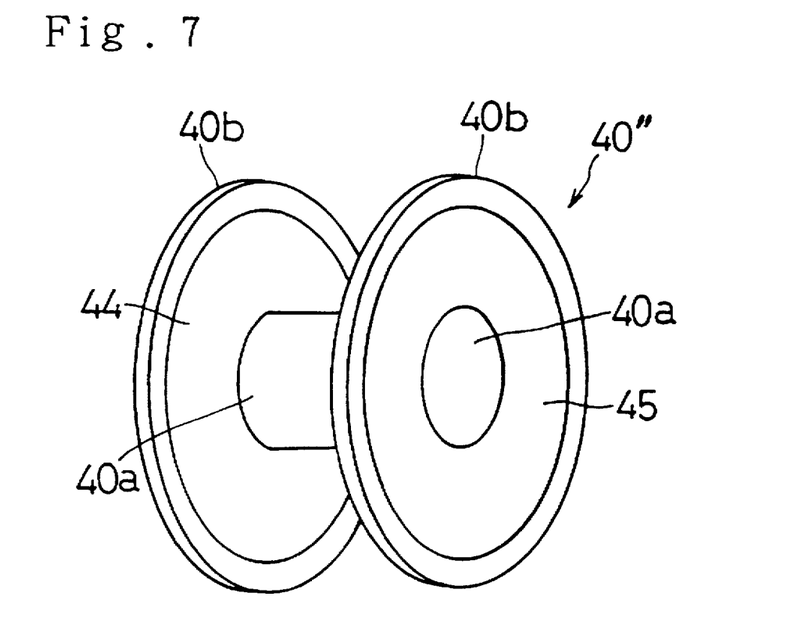
FIG. 7 is a perspective view of the coil bobbin concerning another preferred embodiment of the present invention.

FIGS. 6 and 7 are perspective views of a coil bobbin concerning another preferred embodiment of the present invention.

At a coil bobbin 40' in FIG. 6, a plurality of first through holes 40c passing through in the radial direction of a winding drum portion 40a are formed having appropriate intervals; and at the same time, at the outer peripheral surface of the winding drum portion 40a, there are formed a plurality of grooves 40d which have almost the same width as the thickness of the rotor coil (not shown) which is wound. Furthermore, at the first through hole, the first hole member 41 made of good thermal conductivity is maintained in the state in which it is buried; and at the same time, at the outer peripheral surface of the winding drum portion 40a, there is provided an outer peripheral surface 43 which is formed integrally by using the same good thermal conductivity rubber as that of the first hole member so as to cover the whole area of the outer peripheral surface. On the other hand, at a flange portion 40b, any through hole and any covering layer are not formed.

At a coil bobbin 40" in FIG. 7, a plurality of second through holes 40e passing through in the axial direction are formed having appropriate intervals. Furthermore, at the second through hole, a second hole member 42 made of good thermal conductivity rubber is maintained in the state in which it is buried; and at the same time, at the inner surface and the outer surface of each of flange portion 40b, there are provided an inner covering layer 44 and an outer covering layer 45 which are formed integrally each other so as to cover the surfaces thereof and which are made of the same good thermal conductivity rubber as that of the second hole member. On the other hand, any through hole and any outer peripheral layer are not formed at a winding drum portion 40a.

Having now fully described the present invention, it will be apparent to one of ordinary skill in the art that many changes and modifications can be made thereto without departing from the spirit or scope of the present invention as set forth herein including the appended claims.

We claim:

1. A rotor of an AC generator for a vehicle comprising:
   a rotor core which is shaped in a claw-pole and having a boss portion which is forced to be fixed into a rotor axis and having a disk portion whose pole claws are formed at a tip portion arising in an outside diameter direction from both sides of said boss portion;
   a coil bobbin body having a winding drum portion around which a rotor coil is wound and having flange portions formed at both sides of said winding drum portion; and
   a rotor coil;
   said winding drum portion being inserted to said boss portion of said rotor core; and said flange portions being inserted so as to face and connect an inner peripheral surface of said disc portion of said rotor core;
   said coil bobbin body having a through hole at said winding drum portion and being made of hard resin; a hole member which is kept at said through hole and which is made of good thermal conductivity rubber; and an outer peripheral layer which is formed with said hole member integrally and which is made of good thermal conductivity rubber covering the outer peripheral surface of said winding drum portion.

2. A rotor of an AC generator for a vehicle according to claim 1, wherein at the outer peripheral surface of said winding drum portion, there are formed a plurality of grooves extending in the radial direction.

3. A rotor of an AC generator for a vehicle comprising:
a rotor core shaped in a claw-pole and having a boss portion forced to be fixed into a rotor axis and having a disk portion whose pole claws are formed at a tip portion arising in an outside diameter direction from both sides of said boss portion;
a coil bobbin body having a winding drum portion and having flange portions formed at both sides of said winding drum portion;
a rotor coil wound around said winding drum portion;
said winding drum portion being inserted to said boss portion of said rotor core;
said flange portions being inserted so as to face and connect an inner peripheral surface of said disc portion of said rotor core;
said coil bobbin body having through holes at said flange portions;
hole members filling said through holes being made of good thermal conductivity rubber; and
a covering layer formed integrally with said hole members being made of good thermal conductivity rubber and covering the inner surface and the outer surface of said flange portions.

4. A rotor of an AC generator for a vehicle comprising:
a rotor core shaped in a claw-pole and having a boss portion forced to be fixed into a rotor axis and having a disk portion whose pole claws are formed at a tip portion arising in an outside diameter direction from both sides of said boss portion;
a coil bobbin body having a winding drum portion and having flange portions formed at both sides of said winding drum portion; and
a rotor coil wound around said winding drum portion;
said winding drum portion being inserted to said boss portion of said rotor core;
said flange portions being inserted so as to face and connect an inner peripheral surface of said disc portion of said rotor core;
said coil bobbin body having through holes at said flange portions and said winding drum portion;
hole members filling said through holes being made of good thermal conductivity rubber;
an outer peripheral layer integrally covering an outer peripheral surface of said winding drum portion being integrally formed with said hole members of said winding drum portion and being made of good thermal conductivity rubber; and
a covering layer formed integrally with said hole members and being made of good thermal conductivity rubber covering the inner surface and the other surface of said flange portions.

5. A rotor of an AC generator for a vehicle according to claim 4, wherein at the outer peripheral surface of said winding drum portion, there are formed a plurality of grooves extending in the radial direction.

6. A rotor of an AC generator for a vehicle according to claim 1, wherein said good thermal conductivity rubber is obtained by blending silicon rubber as a matrix resin and alumina of spherical shape as a thermal conductivity filler; and rubber hardness Hs (JIS A) falls in the range of from 55 to 85.

7. A rotor of an AC generator for a vehicle according to claim 1, wherein a fan is provided at at least one end face of an axial direction of said rotor core.

8. A rotor for an AC generator for a vehicle according to claim 3, wherein said covering layer is formed so as to cover an outer surface of said flange portions, and is brought into tight contact with said disc portion of said rotor core so as to prevent a rotation of said coil bobbin body.

9. A rotor for an AC generator for a vehicle according to claim 4, wherein said covering layer is formed so as to cover an outer surface of said flange portions, and is brought into tight contact with said disc portion of said rotor core so as to prevent a rotation of said coil bobbin body.

10. A rotor of an AC generator for a vehicle comprising:
a rotor core shaped in a claw-pole and having a boss portion forced to be fixed into a rotor axis and having a disk portion whose pole claws are formed at a tip portion arising in an outside diameter direction from both sides of said boss portion;
a coil bobbin body having a winding drum portion and having flange portions formed at both sides of said winding drum portion; and
a rotor coil wound around said winding drum portion;
said winding drum portion being inserted to said boss portion of said rotor core;
said flange portions being inserted so as to face and connect an inner peripheral surface of said disc portion of said rotor core;
said coil bobbin body having a through hole at said winding drum portion and being made of hard resin;
a hole member kept at said through hole and made of good thermal conductivity rubber; and
a covering layer integrally formed with said hole and being made of good thermal conductivity rubber covering the outer surface of said flange portions and being brought into tight contact with said disc portion of said rotor core so as to prevent a rotation of said coil bobbin body.

11. A rotor of an AC generator for a vehicle comprising:
a rotor core shaped in a claw-pole and having a boss portion forced to be fixed into a rotor axis and having a disk portion whose pole claws are formed at a tip portion arising in an outside diameter direction from both sides of said boss portion;
a coil bobbin body having a winding drum portion and having flange portions formed at both sides of said winding drum portion; and
a rotor coil wound around said winding drum portion;
said winding drum portion being inserted to said boss portion of said rotor core;
said flange portions being inserted so as to face and connect an inner peripheral surface of said disc portion of said rotor core;
said coil bobbin body having a through hole at said winding drum portion and being made of hard resin;
a hole member being kept at said through hole and being made of good thermal conductivity rubber;
an outer peripheral layer formed integrally with said hole member and being made of good thermal conductivity rubber covering the outer peripheral surface of said winding drum portion; and a covering layer integrally formed with said hole member and being made of good thermal conductivity rubber covering the other surface of said flange portion and being brought into tight contact with said disc portion of said rotor core so as to prevent a rotation of said coil bobbin body.

12. A rotor of an AC generator for a vehicle comprising:

a rotor core shaped in a claw-pole and having a boss portion forced to be fixed into a rotor axis and having a disk portion whose pole claws are formed at a tip portion arising in an outside diameter direction from both sides of said boss portion;

a coil bobbin body having a winding drum portion and having flange portions formed at both sides of said winding drum portion; and a rotor coil wound around said winding drum portion;
said winding drum portion being inserted to said boss portion of said rotor core;
said flange portions being inserted so as to face and connect an inner peripheral surface of said disc portion of said rotor core;
said coil bobbin body having a through hole at said winding drum portion and being made of hard resin;
a hole member filling said through hole being made of good thermal conductivity rubber;
an outer peripheral layer integrally covering an outer peripheral surface of said winding drum portion being formed with said hole member and being made of good thermal conductivity rubber; and
a covering layer formed integrally with said hole member and being made of good thermal conductivity rubber covering at least one of the inner surface and the other surface of said flange portions.

* * * * *